(12) United States Patent  
Bruss et al.

(10) Patent No.: US 8,291,551 B2  
(45) Date of Patent: Oct. 23, 2012

(54) CLAMP ASSEMBLY

(75) Inventors: Paul Thomas Bruss, Cedar Falls, IA (US); James Allen Newhouse, Hudson, IA (US); Trace Dustin Landers, Denver, IA (US)

(73) Assignee: Deere & Company, Moline, IL (US)

( * ) Notice: Subject to any disclaimer, the term of this patent is extended or adjusted under 35 U.S.C. 154(b) by 338 days.

(21) Appl. No.: 12/428,122

(22) Filed: Apr. 22, 2009

(65) Prior Publication Data

US 2010/0269313 A1     Oct. 28, 2010

(51) Int. Cl.
*F16G 11/00* (2006.01)

(52) U.S. Cl. ......... 24/16 R; 24/530; 138/108; 174/72 A; 248/55; 248/68.1; 248/71; 248/74.1; 248/74.2

(58) Field of Classification Search .................. 24/16 R, 24/530; 248/55, 68.1, 71, 77.4, 74.1, 74.2; 138/108; 174/72, 72 A
See application file for complete search history.

(56) References Cited

U.S. PATENT DOCUMENTS

| | | | | |
|---|---|---|---|---|
| 3,894,706 A | * | 7/1975 | Mizusawa | 248/68.1 |
| 5,257,768 A | * | 11/1993 | Juenemann et al. | 248/604 |
| 5,742,982 A | * | 4/1998 | Dodd et al. | 24/16 R |
| 5,794,897 A | * | 8/1998 | Jobin et al. | 248/74.4 |
| 6,561,466 B1 | * | 5/2003 | Myers et al. | 248/74.4 |
| 6,668,865 B2 | * | 12/2003 | Miyamoto et al. | 138/108 |
| 6,708,931 B2 | * | 3/2004 | Miura | 248/68.1 |
| 6,717,055 B2 | * | 4/2004 | Kato | 174/72 A |
| 7,005,579 B2 | * | 2/2006 | Beele | 174/653 |
| 7,534,965 B1 | * | 5/2009 | Thompson | 174/153 G |
| 2002/0000499 A1 | * | 1/2002 | Aoki et al. | 248/74.4 |

* cited by examiner

*Primary Examiner* — Robert J Sandy
*Assistant Examiner* — David Upchurch

(57) ABSTRACT

A clamp assembly is provided for clamping tubular parts to a vehicle frame. The clamp assembly includes a first housing attached to a vehicle frame member and a second housing for attaching to the first housing. A first clamp member is received by the first housing. The first clamp member has recesses formed in an outer surface thereof for receiving tubular parts, and has grooves spaced apart from the outer surface for receiving other tubular part. The first clamp member includes a guide member which is received by a slot formed in the first housing. The first clamp member also includes a post which projects therefrom. A second clamp member is compressed between the second housing and the first clamp member, and the second tubular parts are held between the first clamp member and the second clamp member. The second clamp member includes a bore which receives the post. The first and second housings enclose the clamp members and the tubular parts.

6 Claims, 5 Drawing Sheets

CLAMP ASSEMBLY

FIELD OF THE INVENTION

The present invention relates to a clamp assembly for holding lines, hoses and harnesses which are routed through and around a structure, such as the frame of a vehicle.

BACKGROUND OF THE INVENTION

Vehicles include lines, hoses and harnesses which must be routed through and around the vehicle. Clamps are used to keep such components from vibrating and producing noise. Often such lines, hoses and harnesses must be routed through spaces which are so tight that there is not room for conventional clamps. For example, on some vehicles, such lines, hoses and harnesses must be routed between roof mounted components and chassis components in order to provide fluid and electrical communication therebetween. One possible routing for this situation would be to route the lines and harnesses parallel to and outside the cab posts which support the roof. However, lines and harnesses outside of the cab posts can interfere with visibility and interfere with the location of mirrors, hand rails, and lights. Placing them inside the posts leaves no room for conventional fasteners to hold clamps in place.

SUMMARY OF THE INVENTION

Accordingly, an object of this invention is to provide a clamp assembly which is compact and can be used in very tight locations.

This and other objects are achieved by the present invention, wherein a clamp assembly includes two half clamp members.

DESCRIPTION OF THE PREFERRED EMBODIMENT

Figure 1:
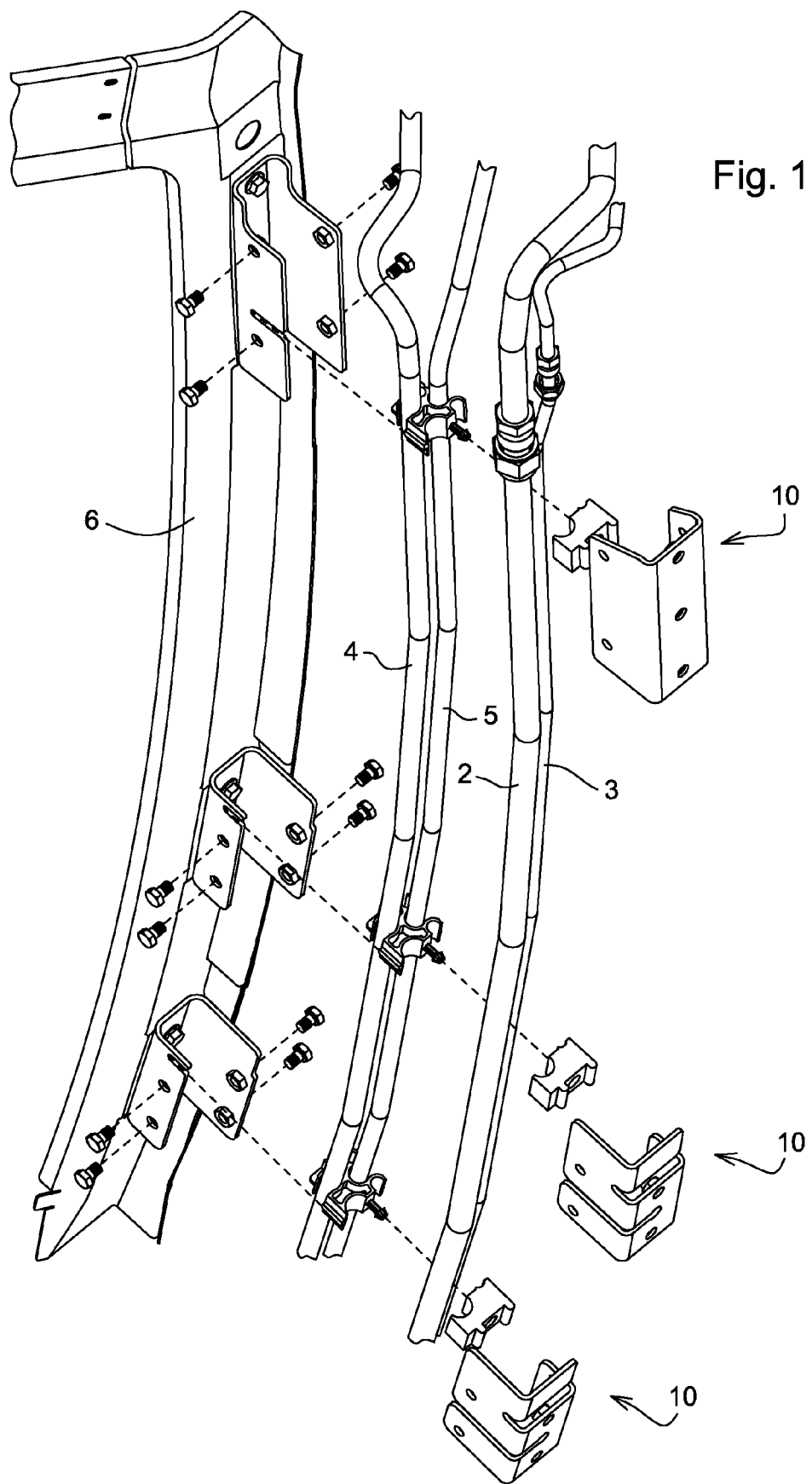
FIG. 1 is an exploded perspective view showing the present invention.
Figure 2:
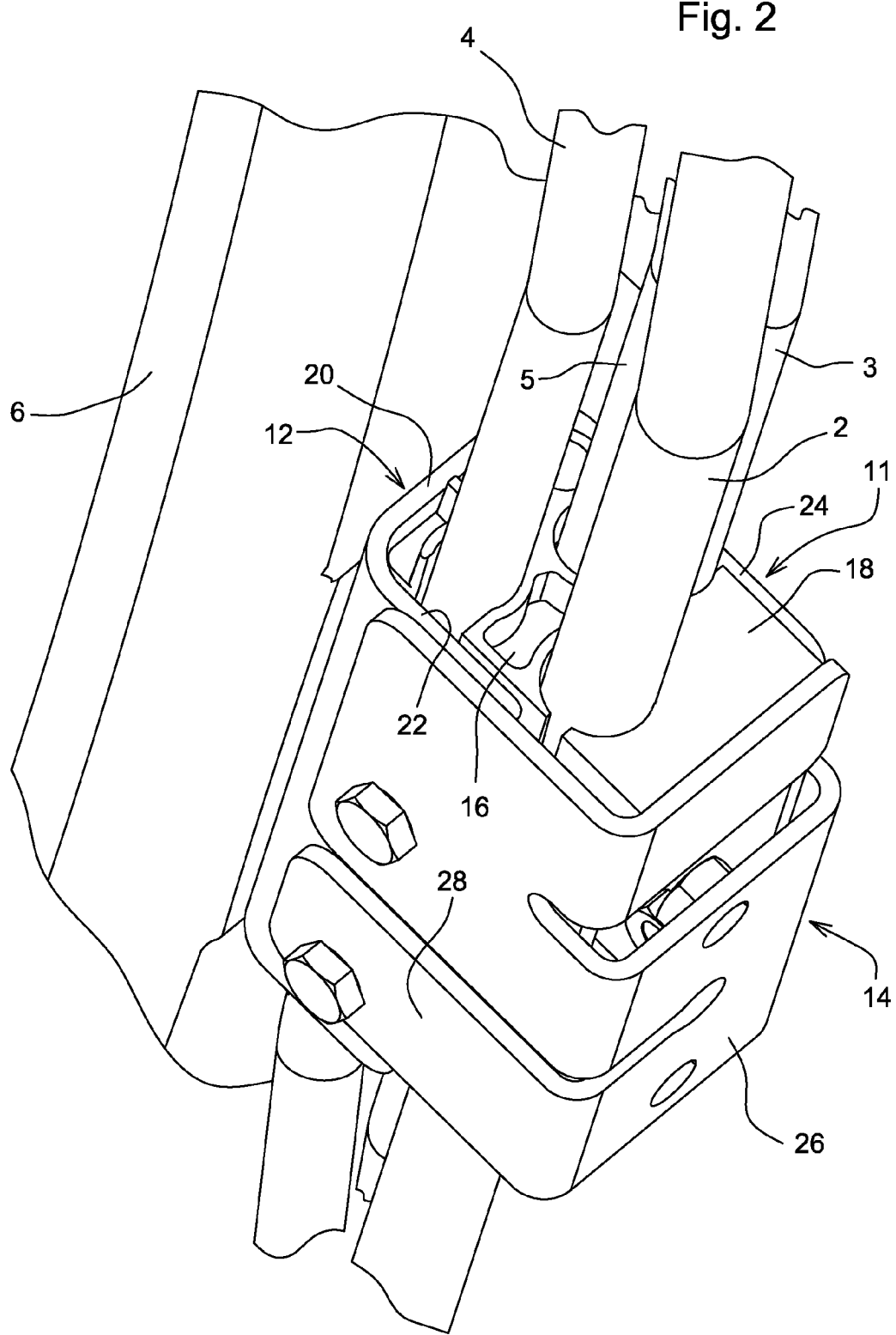
FIG. 2 is a perspective view of a clamp assembly of FIG. 1.
Figure 3:
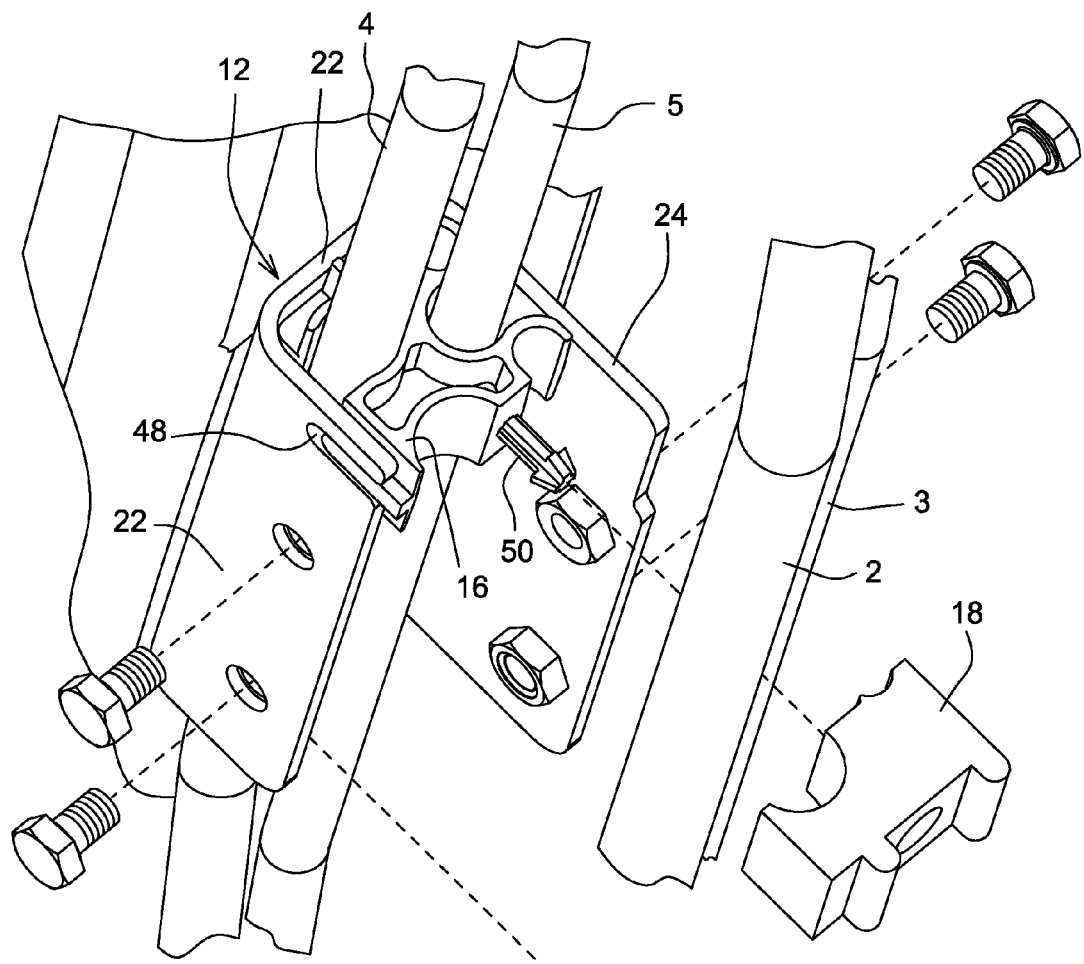
FIG. 3 is an exploded perspective view of the clamp assembly of FIG. 2.
Figure 3:
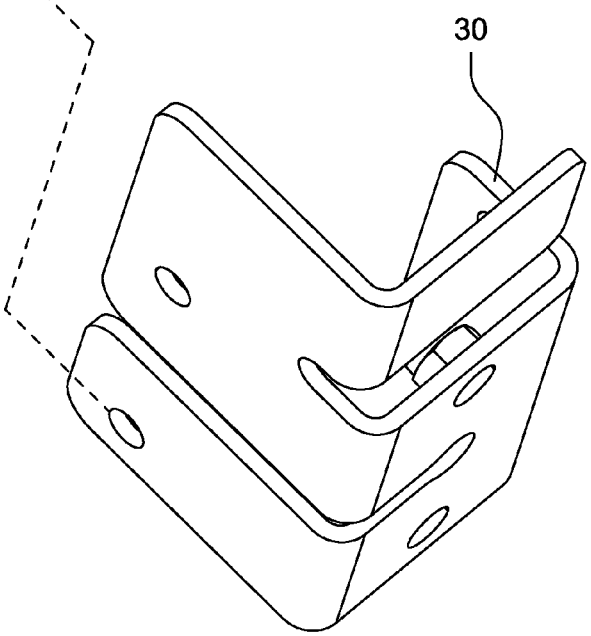

Referring to FIG. 1, a plurality of clamp assemblies 10 hold rigid lines or tubes 2 and 3 and flexible hoses 4 and 5 to a frame member 6, such as a cab post of a vehicle, such as a tractor (not shown). Elements 2-5 could be rigid conduits or flexible hoses or harnesses containing electrical cables, or any similar parts which must be routed on, around or through a vehicle. As best seen in FIGS. 2 and 3, each clamp assembly 10 includes a box-shaped housing or tube section 11 having an inner housing channel 12 and an outer housing channel or cover 14, both with C, J or U-shaped cross sections. The channel 12 and the cover 14 enclose an inner half clamp member 16 and an outer half clamp member 18. Channel 12 includes a base wall 20 and a pair of side wall 22 and 24. Cover 14 includes a base wall 26 and a pair of side wall 28 and 30. The inner housing channel 12 and the outer housing channel 14 are preferably bolted together.

Figure 4:
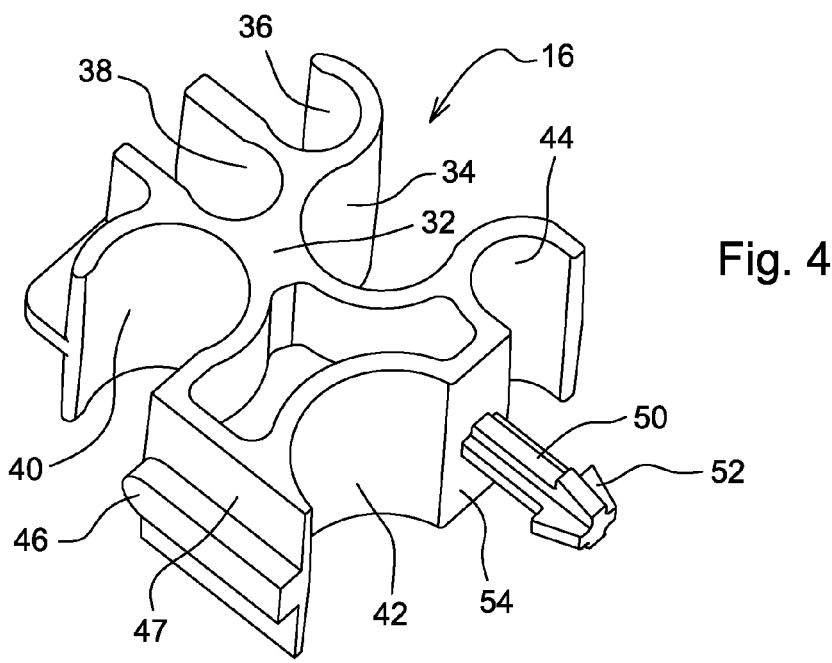
FIG. 4 is a perspective view of an inner clamp member of the clamp assembly of FIG. 2.

Referring now to FIG. 4, inner clamp member 16 is preferably made of a stiff plastic and includes a body 32 in which are formed a plurality of inner slots or grooves 34, 36, 38 and 40, and one or more outer grooves or slots 42 and 44. An elongated guide member 46 projects from a side 47 of the body 32 and is slidably received by a complimentary slot 48 formed in side wall 22. A dart or post 50 with a pronged end 52 projects from end 54 and away from slot 38.

As best seen in FIG. 4, slots 42 and 44 both face in the same first direction. Groove 34 faces in a direction which is different from the first direction. Grooves 36 and 38 face in yet another different direction. Groove 40 faces in yet another different direction. As best seen in FIGS. 3 and 4 slots 34, 36, 38 and 40 are covered by portions of the channel 12.

Figure 5:
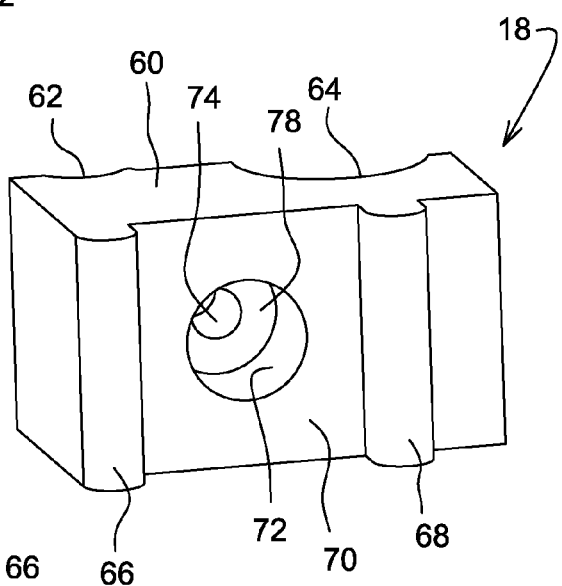
FIGS. 5 and 6 are perspective views of an outer clamp member of the clamp assembly of FIG. 2.
Figure 6:
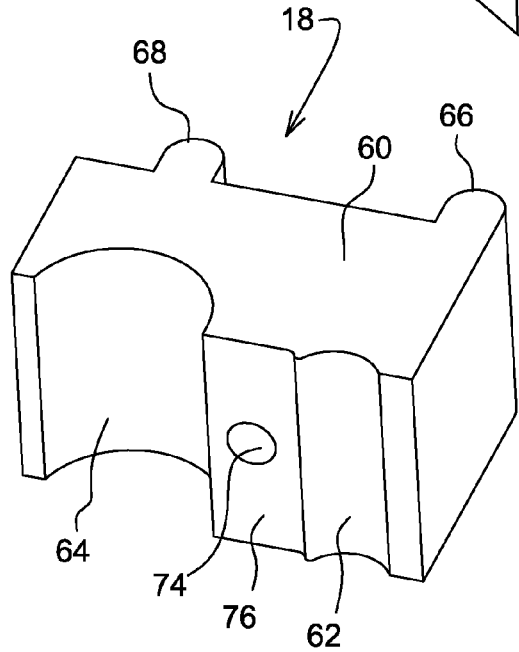

Referring now to FIGS. 5 and 6, outer clamp member 18 is preferably made of a flexible material and includes a body 60 in which are formed a pair of inner recesses 62 and 64 which face towards and receive hard lines 2 and 3. A pair of spaced apart ridges 66 and 68 extend along and project from outer end 70 of the body 60. A larger diameter bore 72 extends partway into the body 60 from outer surface or end 70 and communicates with a smaller diameter bore 74 which extends partway into body 60 from inner surface or end 76. Bores 72 and 74 are separated by annular wall 78.

Figure 7:
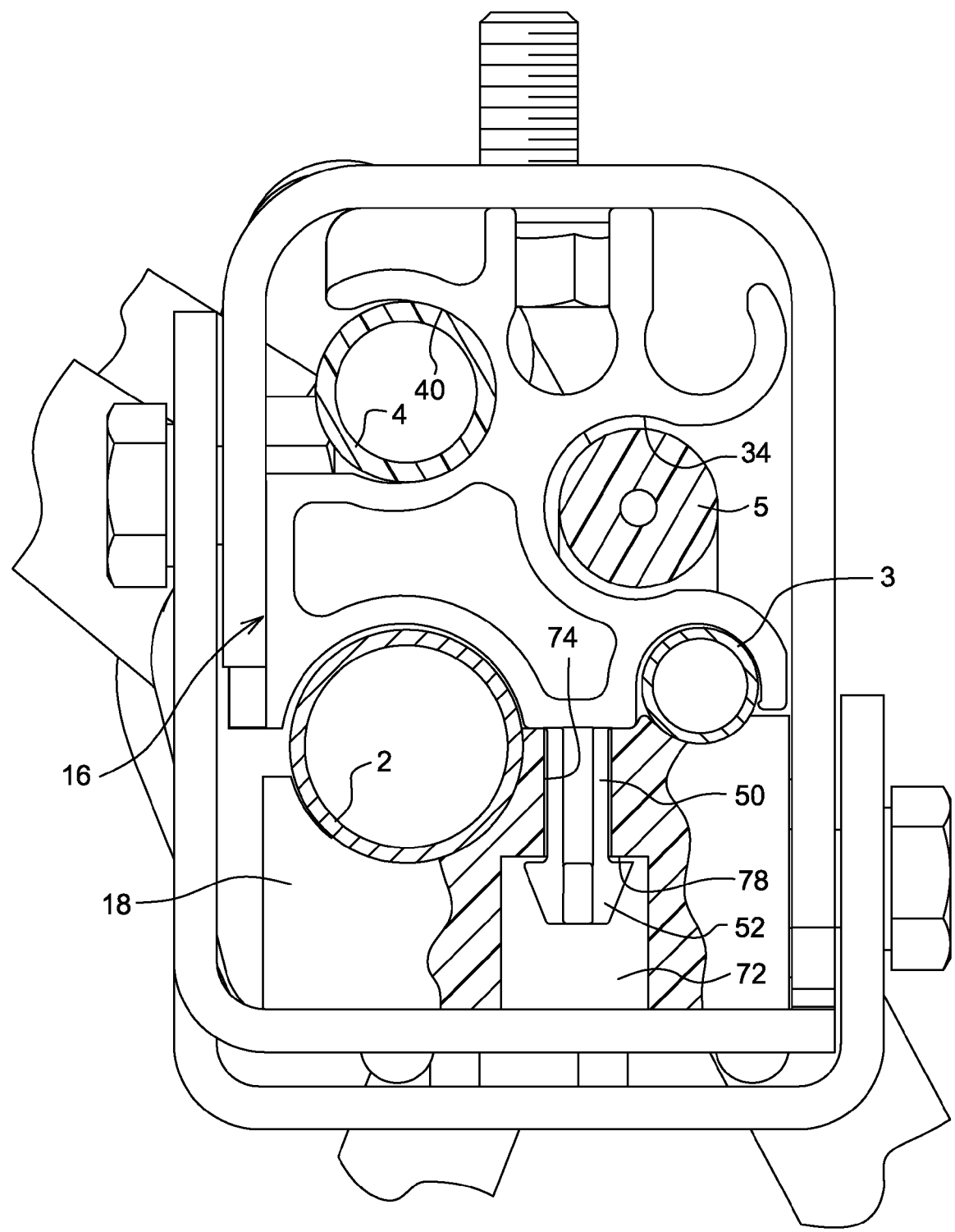
FIG. 7 is a top end view of the clamp assembly of FIG. 1, with a portion sectioned for clarity.

Referring now to FIG. 7, when the clamp assembly 10 is assembled, lines 4 and 5 are inserted into slots 40 and 34, respectively, of inner clamp member 16, and this assembly is then slid into inner housing 12 with guide member 46 being received by slot 48. Then lines 2 and 3 are moved into grooves 42 and 44, respectively. Then outer clamp member 18 is oriented and moved towards inner clamp member 16 until post 50 moves through smaller diameter bore 74 and pronged end 52 moves past and engages annular wall 78. Thus, lines 2 and 3 are held between inner clamp member 16 and outer clamp member 18. Finally outer housing 14 is attached to inner housing 12 so that outer clamp member 18 is compressed between the inner clamp member 16 and a wall of the outer housing 14.

These half clamp members 16 and 18 include formed parts into which harness and hoses could be snapped into place. The half clamp members also include parts for holding hard lines and a dart or post-shaped member 50. The dart member 50 may be used to temporarily clamp member 16 to clamp member 18, and to thereby hold both the elastomeric clamp member 18 and the hard lines in place until the outer housing part 14 is assembled. When the housing part 30 is bolted in place, the elastomeric clamp member 18 is compressed which holds the clamp member 16, hoses, and harnesses in place in a minimum amount of space.

With this design, the lines and harnesses can actually be routed in the space available while providing a consistent path for these components that deters abrasion. The inner clamp member 16 slides into the slot 48 in the inner housing 12 so that no fasteners (temporary or permanent) are required to hold the clamp during assembly. The elastomeric clamp member 18 not only compresses to hold the lines but, being an elastomer it can accommodate some variation in, or size of, the enclosure in which the lines are routed. In arranging the components so that the hard lines are the last to assemble, these lines also provide some protection to the harnesses and hoses from bolts used to mount hardware on the finished cover of the enclosure.

This clip assembly can be used on many types of vehicles. It can be used in a tractor which has a structural cab frame (ROPS) to protect the operator. The lines and harnesses may be concealed behind a finish cover which is mounted to the outside of the frame. Also, components such as mirrors, hand rails and lights can be mounted on the outer housing. Multiple box-shaped housing parts can hold a finish cover in place, and components can be mounted to the housing parts to avoid vibration.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A clamp assembly for clamping tubular parts to a vehicle frame, the assembly consisting of:
    a first housing attached to a vehicle frame member and having a slot formed therein;
    a second housing for attaching to the first housing, the second housing being attachable to and detachable from the first housing; and
    only two clamp members, including a one-piece integral first clamp member and a one-piece integral second clamp member, the first clamp member being received by the first housing, the first clamp member having at least one recess opening in a first direction and formed in an outer surface thereof and receiving a first tubular part, and having at least one groove spaced apart from said outer surface and receiving a second tubular part, said groove opening in a second direction which differs from said first direction, the first clamp member including a guide member which is received by the slot, and the first clamp member including a post which projects therefrom;
    the second clamp member being separate and distinct from the first clamp member, the second clamp member being compressed between the second housing and the first clamp member, and the second tubular part being held between the first clamp member and the second clamp member, and the second clamp member including a bore which receives the post, the first and second housing enclosing the clamp members and the tubular parts.

2. A clamp assembly for clamping to elongated parts, the assembly comprising:
    a first housing having a slot formed therein;
    a second housing for attaching to the first housing;
    a one-piece integral first clamp member received by the first housing, the first clamp member having at least one recess opening in a first direction and formed in an outer surface thereof and receiving a first elongated part, and having at least one groove spaced apart from said outer surface and receiving a second elongated part, said groove opening in a second direction which differs from said first direction, the first clamp member including a guide member which is received by the slot, and the first clamp member including a post which projects therefrom; and
    a one-piece integral second clamp member, the second clamp member being separate and distinct from the first clamp member, the second clamp member being compressed between the second housing and the first clamp member, and the second elongated part being held between the first clamp member and the second clamp member, and the second clamp member including a bore which receives the post.

3. The clamp assembly of claim 2, wherein:
    the first clamp member is formed out of a rigid material; and
    the second clamp member is formed out a resilient material.

4. The clamp assembly of claim 2, wherein:
    the post has a pronged head which engages a surface of the second clamp member.

5. The clamp assembly of claim 2, wherein:
    the first and second housings enclose the clamp members and the elongated parts.

6. A clamp assembly for clamping tubular parts to a vehicle frame, the assembly comprising:
    a first housing attached to a vehicle frame member and having a slot formed therein;
    a second housing for attaching to the first housing;
    a one-piece integral first clamp member received by the first housing, the first clamp member having at least one recess opening in a first direction and formed in an outer surface thereof and receiving a first tubular part, and having at least one groove spaced apart from said outer surface and receiving a second tubular part, said groove opening in a second direction which differs from said first direction, the first clamp member including a guide member which is received by the slot, and the first clamp member including a post which projects therefrom; and
    a one-piece integral second clamp member, the second clamp member being separate and distinct from the first clamp member, the second clamp member being compressed between the second housing and the first clamp member, and the second tubular part being held between the first clamp member and the second clamp member, and the second clamp member including a bore which receives the post, the first and second housing enclosing the clamp members and the tubular parts.

* * * * *